United States Patent
Mathew et al.

(10) Patent No.: US 9,635,121 B2
(45) Date of Patent: Apr. 25, 2017

(54) SYSTEMS AND METHODS FOR CACHING HTTP POST REQUESTS AND RESPONSES

(71) Applicant: PayPal, Inc., San Jose, CA (US)

(72) Inventors: Suresh Mathew, Sunnyvale, CA (US); Kumar Rethi, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 781 days.

(21) Appl. No.: 13/955,175

(22) Filed: Jul. 31, 2013

(65) Prior Publication Data

US 2014/0040415 A1    Feb. 6, 2014

Related U.S. Application Data

(60) Provisional application No. 61/680,102, filed on Aug. 6, 2012.

(51) Int. Cl.
*G06F 15/16* (2006.01)
*H04L 29/08* (2006.01)
*G06F 17/30* (2006.01)

(52) U.S. Cl.
CPC .... *H04L 67/2842* (2013.01); *G06F 17/30902* (2013.01); *H04L 67/02* (2013.01); *H04L 67/2876* (2013.01)

(58) Field of Classification Search
None
See application file for complete search history.

(56) References Cited

U.S. PATENT DOCUMENTS

| | | | | |
|---|---|---|---|---|
| 6,205,149 B1* | 3/2001 | Lemaire | ............ | H04L 12/40032 370/400 |
| 8,161,236 B1* | 4/2012 | Noveck | ............... | G06F 12/0875 711/113 |
| 2003/0217169 A1* | 11/2003 | James | ............... | G06F 17/30902 709/231 |
| 2004/0133630 A1* | 7/2004 | Coles | ................ | G06F 17/30899 709/202 |
| 2005/0138176 A1* | 6/2005 | Singh | ................ | G06F 17/30902 709/226 |

OTHER PUBLICATIONS

Fielding, et al. HTTP/1.1: Caching in HTTP (part of RFC 2616). Feb. 1, 2001.*
"Sun GlassFish Enterprise Server 2.1 Application Deployment Guide" Posted at <https://web.archive.org/web/20120624044825/http://docs.oracle.com/cd/E19879-01/820-4337/beatm/index.html> on Jun. 24, 2012.*

\* cited by examiner

*Primary Examiner* — Scott B Christensen
(74) *Attorney, Agent, or Firm* — Maschoff Brennan

(57) ABSTRACT

With an idempotent POST request, the URL (and headers) cannot be used as an HTTP cache key. To cache idempotent POST requests, the POST body is digested and appended the URL with the digest and used as the cache key. Subsequent requests with the same payload will end up hitting the cache rather than the origin server. A forward cache proxy at the client end and reverse cache proxy at the server end are deployed. The client sends the request to the forward proxy that looks up the cache. If there is a cache miss, the forward cache proxy digests the body and sends only the digest to the reverse proxy. The reverse cache proxy looks up request cache to find if there is a match for the request and send that request to the server.

18 Claims, 5 Drawing Sheets

SYSTEMS AND METHODS FOR CACHING HTTP POST REQUESTS AND RESPONSES

This non-provisional patent application claims the priority benefit of U.S. Provisional Patent Application No. 61/680,102 filed Aug. 6, 2012, which is incorporated herein by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2012-13, All Rights Reserved.

TECHNICAL FIELD

This application relates generally to network communications and more specifically to systems and methods for caching HTTP POST requests and responses.

BACKGROUND

The basic purpose of HTTP (hypertext transfer protocol) caching is to provide a mechanism for applications to scale better and perform faster. HTTP caching, however, is only applicable to idempotent requests (e.g., requests that will produce the same results if executed once or multiple times). Only idempotent and nullipotent responses can be cached because only such requests yield the same result when run one or multiple times.

In HTTP, this means that GET requests can be cached but not POST requests because POST requests are not idempotent or nullipotent. The POST request method is designed to request that a web server accept the data enclosed in the request message's body for storage. As part of a POST request, an arbitrary amount of data of any type can be sent to the server in a request message body. A header field in the POST request usually indicates the message body's Internet media type. It is often used when uploading a file or submitting a completed web form.

The HTTP GET request method is designed to retrieve information from the server. As part of a GET request, some data can be passed within the URI's query string, specifying for example search terms, date ranges, or other information that defines the query. But it is possible that an idempotent request cannot be sent as a GET request just because it exceeds limits imposed by popular Internet software. For example, search APIs typically take a lot of parameters, especially when there are a lot of characteristics for the product and all of them have to be passed as parameters. This leads to the question, the recommended ways of communicating over the wire when there are more parameters in the request than the "permitted" limit of a GET request include:

1. Re-evaluating the interface design if it takes a large number of parameters. Idempotent requests typically take a limited number of parameters that falls well within the GET limit.
2. Generating GET requests that are less than 2 KB. There is no such hard and fast limit imposed in the HTTP specification, but Internet clients and servers impose this limit. Some clients and servers support GET requests up to 8 KB.
3. Send the body in a GET request.

None of these recommendations provide an acceptable solution.

BRIEF DESCRIPTION OF THE DRAWINGS

Some embodiments are illustrated by way of example and not limitation in the figures of the accompanying drawings in which.

DETAILED DESCRIPTION

Example methods and systems to cache HTTP POST requests and responses are described. In the following description, for purposes of explanation, numerous specific details are set forth in order to provide a thorough understanding of example embodiments. It will be evident, however, to one skilled in the art that the present invention may be practiced without these specific details.

HTTP caching is not just used for GET requests. By digesting the POST body, handling non-idempotent requests, and distinguishing between idempotent and non-idempotent requests, a substantial savings in round trips and bandwidth may be realized. For further savings, cache handshaking may be employed to send only the digest across the Internet—ideally, by implementing a forward cache proxy on the client side and a reverse cache proxy on the server side, but one proxy is sufficient to make a difference.

Figure 1:
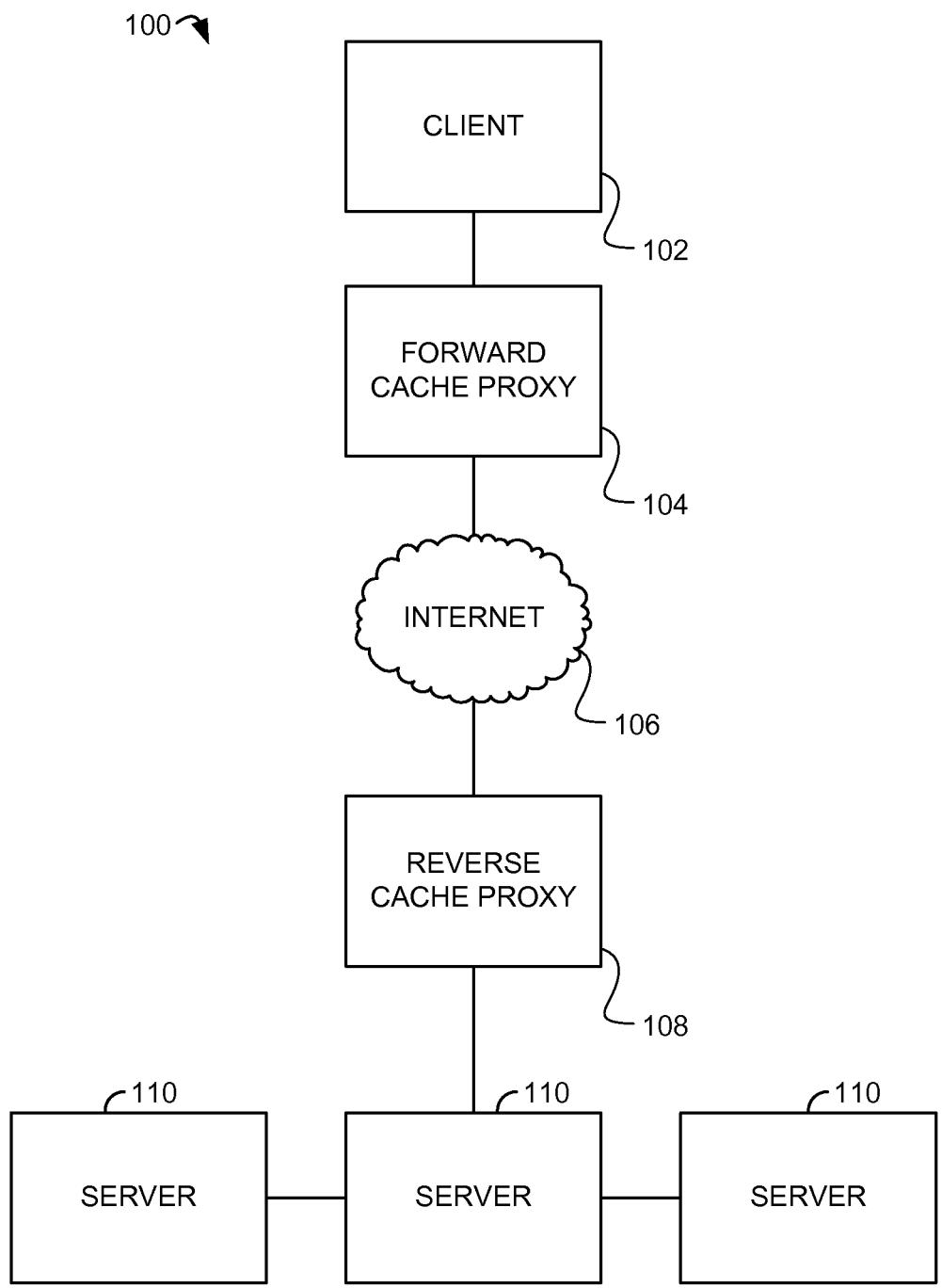
FIG. 1 is a network topology diagram depicting a client-server system, within which one example embodiment may be deployed.

HTTP caching mechanism involves client, proxy and server systems. Embodiments discussed herein focus mainly on the proxy caching which sits in between the client and server. FIG. 1 is a network topology diagram depicting a client-server system 100, within which one example embodiment may be deployed. A server system comprising servers 110, may represent a network-based marketplace or publication system and provides server-side functionality, via the Internet 106 or Wide Area Network (WAN) to one or more clients such as client 102. The client 102 refers to a web client (e.g., a browser) or a programmatic client executing on respective client machines.

A forward cache proxy 104 is situated between the client 102 and the Internet 106 (or other network). The forward cache proxy 104 stores or "caches" responses to idempotent or nullipotent requests, such as GET requests. A cache-hit occurs when a response to a request received from the client has been previously stored in the forward cache proxy 104. The forward cache proxy 104 saves bandwidth, reduces round-trip delay time and latency.

A reverse cache proxy 108 is situated between the Internet 106 (or other network) and one or more servers 110. The reverse cache proxy 108 caches responses sent by the servers in response to requests received from one or more clients 102. The reverse cache proxy 108 offloads the server by responding to requests to which the server has previously generated responses.

The HTTP specification allows the caches (the forward cache proxy 104 or the reverse cache proxy 108) to respond with a cached response if one of the following three conditions is satisfied. The cached response is consistent (e.g., semantically equivalent) with the response of the server 110, had there been one such request. The freshness of the cached response is acceptable to the client. If the freshness of the cached response is not acceptable, an appropriate warning is attached to the cached response.

Figure 2:
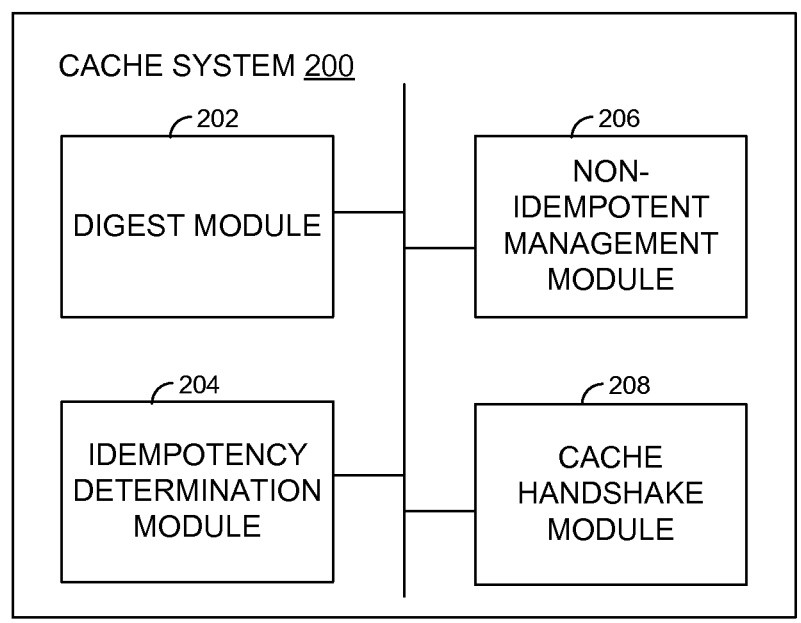
FIG. 2 is a block diagram of an example cache system, according to various embodiments.

FIG. 2 is a block diagram of an example cache system 200, according to various embodiments. The cache system 200 may be implemented in hardware, software executed using one or more hardware processors, or a combination thereof. The cache system 200 may be executed at a forward cache proxy 104 or a reverse cache proxy 108.

The example cache system 200 caches idempotent requests. Upon receiving a request, the cache system 200 examines the request to identify one or more cache headers, and sends the request to the server 110. The cache system 200 examines the response received from the server, and if cacheable, caches the response using the Uniform Resource Locator (URL) as the key (along with some headers in certain cases) and the response as the value. With GET requests, for the same URL, repeated invocation does not change the response. Intermediaries can make use of this property to safely cache GET requests. But this is not the case with an idempotent POST request. The URL (and headers) cannot be used as the key because the response could be different with the same URL but with a different body.

The example cache system 200 may allow caching of responses to idempotent POST requests using one or more modules. Upon receiving a POST request, a digest module 202 digests the body of the POST request along with additional headers. The digest module 202 then appends the URL with the digest. The digest module 202 uses both the digest and URL as the cache key. In this way, the cache key has been modified to include the payload in addition to the URL. Subsequent requests with the same payload (e.g., request) will hit the cache rather than the server. In practice, additional headers (e.g., to identify the media type of the POST request) and their values may be added to the cache key to establish uniqueness among the stored cache keys. These headers are selected based on the use case. For example, if MD5 is used to digest the body, then Content-MD5 could be used as a header.

After generating a cache key, an idempotency determination module 204 distinguishes idempotent POST requests from non-idempotent requests. The idempotency determination module 204 may perform this task by, for example: configuring the URLs and patterns in the proxy so that it does not cache if there is a match; adding context aware headers to distinguish between different requests; or basing the cache logic on some naming conventions. For example APIs with names that start with words like "set", "add", or "delete" are not cached and will be sent to the server 110.

To manage non-idempotent POST requests, a non-idempotent management module 206 may do one of three operations. First, the request may be forwarded to the server 110 if the URL is in the configured "DO NOT CACHE" URL list, if the cached digest and the digest of the request do not match, if the cache expiry time is passed, or if there is a request to revalidate the request. The non-idempotent management module 206 may attach a warning indicating that the content may be stale, thereby accommodating the HTTP specification. In some instances, the non-idempotent management module 206 may allow users to turn off the proxy using client-side (e.g., client 102) and forward the request directly to the servers 110. In some instances, the non-idempotent management module 206 may be implemented using the Apache Traffic Server, customized to cache POST requests and the cache key using the operations described herein.

A cache handshake module 208 is optionally included in the cache system 200. The cache handshake module 208 is used in instances like those of FIG. 1 where a forward cache proxy 104 is deployed at the client 102 and a reverse cache proxy 106 is deployed at the server 110. The client 102 sends the request to the forward cache proxy 104, and the proxy 104 performs a cache lookup. In the case of a cache miss, the forward cache proxy 104 digests the body (using the digest module 202) and the cache handshake module 208 sends only the digest to the reverse cache proxy 106. The reverse cache proxy 106 looks for a match in the request cache stored at the reverse cache proxy 106 and, if found, sends that request to the server 110. The cache handshake module 208 does not send the full request from the forward cache proxy 104 to the reverse cache proxy 108.

The server 110, in embodiments having a cache handshake module 208, sends the response to the reverse cache proxy 108, which digests the response and sends only the digest—not the full response. The POST data is refrained from being sent, at the cost of an additional round trip of the digest key if the result is a cache miss. In most networks, the round trip delay time between the client 102 and the forward cache proxy 102 and between the server 110 and the reverse cache proxy 108 is negligible when compared to the round trip delay time between the client 102 and the server 110. This effect is due to the forward cache proxy 104 and the client 102 being close to each other and in the same LAN; likewise, the reverse cache proxy 108 and the server 110 may be close to each other and in the same LAN. The network latency is between the proxies 104 and 108, where data travels through the Internet 106.

The cache handshake module 208 may be applied to just one proxy on either side (e.g., either forward cache proxy 104 or reverse cache proxy 108) with appropriate modifications made to the client 102 or server 110. In such cases, the client 102 or server 110 sends the digest instead of the whole body. With the two-proxy architecture, the client 102 and server 110 remain unchanged and, as a result, any HTTP client or server can be optimized.

POST requests typically are large in size (e.g., 10 KB to 15 KB). By not having the proxy 104 or 108 send the whole request and the whole response, bandwidth is conserved and response time may be reduced when processing large requests and responses. Although the savings might seem trivial at first glance, they are not so when it comes to real traffic loads. Even if the POST response is not cached, bandwidth is conserved by not sending the payload. This solution may be implemented using distributed caches deployed within the network.

Figure 3:
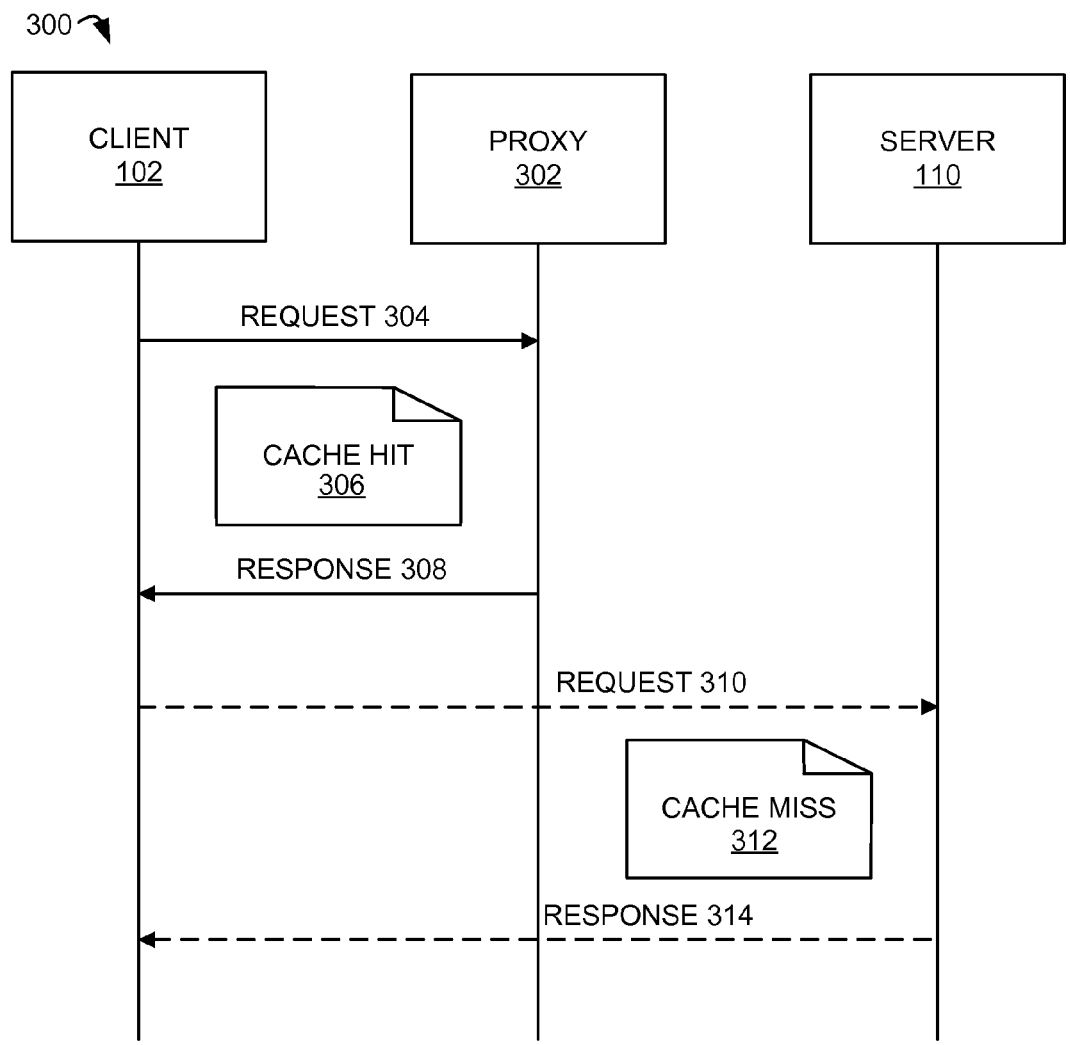
FIG. 3 is a flowchart illustrating an example method, according to various embodiments.

FIG. 3 is a flowchart illustrating an example method 300, according to various embodiments. The method of FIG. 3 may be used in network topologies having a single cache proxy (e.g., either a forward cache proxy 104 or a reverse cache proxy 108). The method 300 may speed up repeated requests by not performing the round trip from proxy to the server 110. As a hosted solution, one user's request speeds not only his own subsequent requests but also the requests from other users, provided the cache is set to be shared across requests and the header permits it. Bandwidth between proxy hosting the cache system 200 and server 110 is conserved. For example, in one test, the performance comparison of an API invocation which has a sum of 20 KB data transfer and deployed as a forward cache proxy, had the result where not using caching took 188 ms while using cache, the same invocation took 90 ms. Variants of this solution can be used to cache the request or response or both at the forward proxy, reverse proxy or both. A customized Apache Traffic Server may be used that is modified to cache POST requests and the cache key.

In FIG. 3, a proxy 302 is a cache proxy (e.g., the forward cache proxy 104 or the reverse cache proxy 108) running the cache system 200. A client 102 generates a request 304 and sends the full request 304 to the proxy 302. The proxy 302 identifies a cache hit 306 for the request 304 in the local cache. The proxy 302 sends a response 308 to the client 102.

In instances where there is no cache hit, such as when the client 102 generates a request 310 and sends the request 310 to the proxy 302, the proxy 302 identifies that there is a cache miss 312. The request 310 is sent to the server 110. The server 110 returns a response 314 to the proxy 302 and the client 102. The proxy 302 may cache the response 314.

Figure 4:
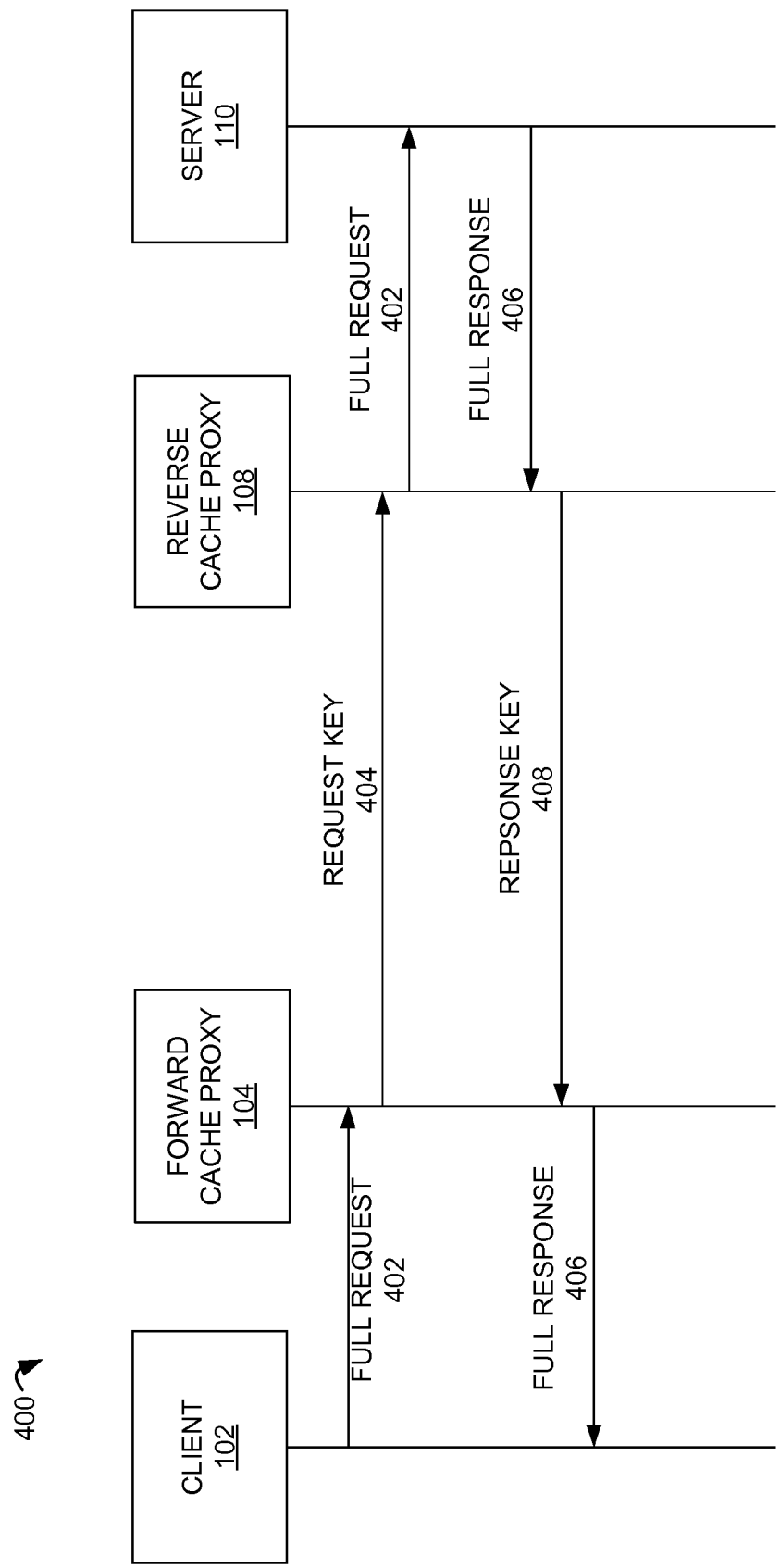
FIG. 4 is a flowchart illustrating an example method, according to various embodiments.

FIG. 4 is a flowchart illustrating an example method 400 using the cache handshake module 208, according to various embodiments. In these instances, the request payload travels to the reverse cache proxy 108 only if there is a cache miss. So the round trip delay time and bandwidth are both improved. As a hosted solution, one request will help save the other user requests travelling between the proxies 104 and 108. Non-idempotent requests will be sent to the server 110 thereby being HTTP compliant too. There is no technical debt involved. The proxies, if removed, would be fully HTTP-compliant.

In FIG. 4, a full request 402 is sent from the client 102 to the forward cache proxy 104. A request key 404 is sent from the forward cache proxy 104 to the reverse cache proxy 108. The reverse cache proxy 108 the sends the full request 402 to the server 110. The server 110 generates and sends a full response 406 to the reverse cache proxy 108. The reverse cache proxy 108 sends the corresponding response key 408 to the forward cache proxy 104. The forward cache proxy 104 sends the full response 406 to the client 102.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
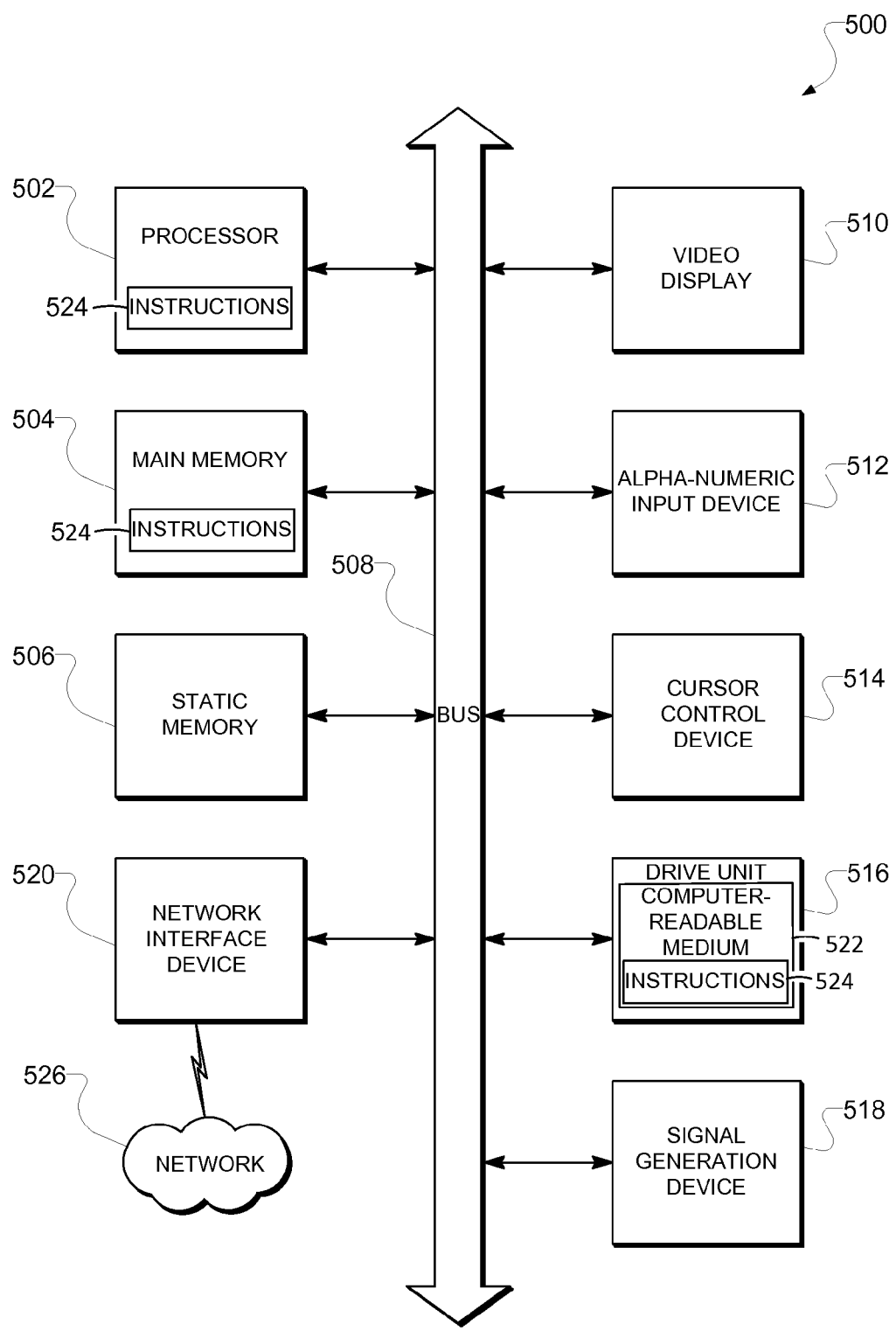
FIG. 5 is a diagrammatic representation of machine in the example form of a computer system within which a set of instructions, for causing the machine to perform any one or more of the methodologies discussed herein, may be executed.

FIG. 5 is a block diagram of machine in the example form of a computer system 500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 150 (e.g., a liquid crystal display (LCD) or a cathode ray tube (CRT)). The computer system 500 also includes an alphanumeric input device 552 (e.g., a keyboard or a touch-sensitive display screen), a user interface (UI) navigation device 514 (e.g., a mouse), a disk drive unit 516, a signal generation device 518 (e.g., a speaker) and a network interface device 520.

Machine-Readable Medium

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
    a processor; and
    memory coupled to the processor and storing instructions that, when executed by the processor, cause the system to:
        store cache keys and responses in a proxy cache for POST requests that are determined to be idempotent to enable cache hits for subsequent matching idempotent POST requests;
        receive a POST request;
        generate, in response to receiving the POST request, a digest of a body of the POST request;
        append a URL of the POST request with the digest;
        generate a cache key using the URL with the appended digest;
        determine that the POST request is non-idempotent by configuring URLs and patterns in the proxy cache; and
        in response to the determination that the POST request is non-idempotent, forward the non-idempotent POST request to a server.

2. The system of claim 1, wherein the memory further stores instructions for causing the system to add one or more headers and corresponding values to the cache key.

3. The system of claim 1, wherein the memory further stores instructions for causing the system to identify a subsequent POST request according to a corresponding cache key having the same body as the POST request.

4. The system of claim 3, wherein the memory further stores instructions for causing the system to reply to the subsequent POST request using data stored in a cache proxy.

5. The system of claim 1, wherein the memory further stores instructions for causing the system to determine that the POST request is non-idempotent by adding context aware headers.

6. The system of claim 1, wherein the memory further stores instructions for causing the system to determine that the POST request is non-idempotent by basing cache logic on at least one naming convention.

7. The system of claim 1, wherein determining that the POST request is non-idempotent includes determining that the URL is in a "DO NOT CACHE" URL list.

8. The system of claim 1, wherein the memory further stores instructions for causing the system to forward the non-idempotent POST request to the server if a cached digest and the digest of the POST request do not match.

9. The system of claim 1, wherein the memory further stores instructions for causing the system to forward the non-idempotent POST request to the server if a cache expiry time is passed.

10. The system of claim 1, wherein the memory further stores instructions for causing the system to forward the non-idempotent POST request to the server if there is a request to revalidate the POST request.

11. The system of claim 1, wherein the system is HTTP compliant.

12. The system of claim 1, wherein the POST request is at least 10 KB.

13. The system of claim 1, wherein the memory further stores instructions for causing the system to manage communications between a forward cache proxy and a reverse cache proxy.

14. The system of claim 13, wherein the memory further stores instructions for causing the system to instruct the forward cache proxy to digest the body of the POST request and to transmit the digest to the reverse cache proxy.

15. The system of claim 14, wherein the memory further stores instructions for causing the system to instruct the reverse cache proxy to identify a stored match in a request cache based on the digest.

16. The system of claim 15, wherein the memory further stores instructions for causing the system to instruct the reverse cache proxy to send a response key to the forward cache proxy based on the stored match.

17. A method comprising:
    storing cache keys and responses in a proxy cache for POST requests that are determined to be idempotent to enable cache hits for subsequent matching idempotent POST requests;
    receiving a POST request by a computer system;
    in response to receiving the POST request, generating, by the computer system, a digest of a body of the POST request;
    appending, by the computer system, a URL of the POST request with the digest;
    generating a cache key using the URL with the appended digest;
    determining that the POST request is non-idempotent by configuring URLs and patterns in the proxy cache; and
    in response to the determination that the POST request is non-idempotent, forwarding, by the computer system, the non-idempotent POST request to a server.

18. A non-transitory computer-readable medium storing instructions that, when executed by a computer system, cause the computer system to perform operations comprising:
- storing cache keys and responses in a proxy cache for POST requests that are determined to be idempotent to enable cache hits for subsequent matching idempotent POST requests;
- receiving a POST request;
- in response to receiving the POST request, generating a digest of a body of the POST request;
- appending a URL of the POST request with the digest;
- generating a cache key using the URL with the appended digest;
- determining that the POST request is non-idempotent by configuring URLs and patterns in the proxy cache; and
- in response to the determination that the POST request is non-idempotent, forwarding the non-idempotent POST request to a server.

* * * * *